Titus & Des Granges.
Iron Pavement.
No. 957. Reissued May 1, 1860.
Fig; 1.
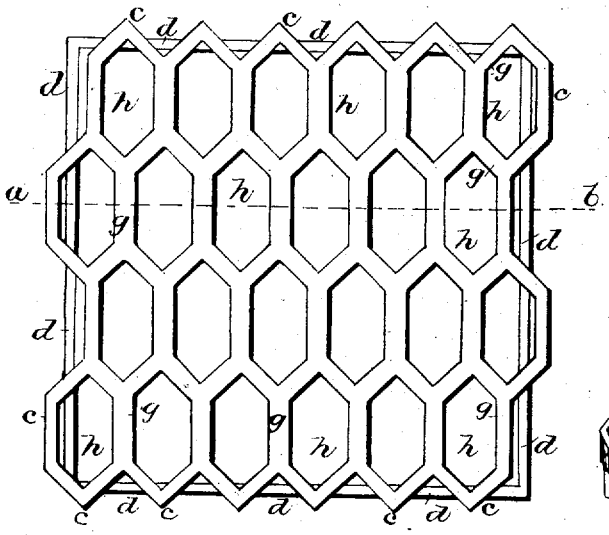
Fig; 4.
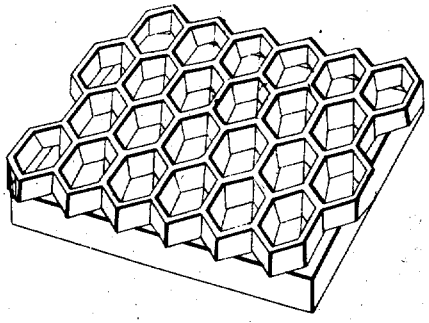
Fig; 2.
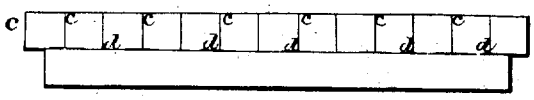
Fig; 3.
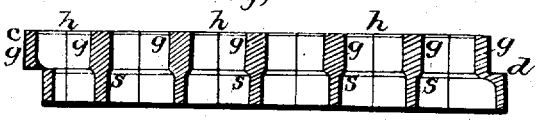

UNITED STATES PATENT OFFICE.

S. H. TITUS AND OTTO DES GRANGES, OF ST. LOUIS, MISSOURI.

IMPROVEMENT IN CELLULAR IRON PAVEMENT.

Specification forming part of Letters Patent No. 18,417, dated October 13, 1857; Reissue No. 957, dated May 1, 1860.

*To all whom it may concern:*

Be it known that we, S. H. TITUS and OTTO DES GRANGES, of the city and county of St. Louis and State of Missouri, have invented a new and Improved Shape for Metallic Pavement; and we do hereby declare that the following is a full, clear, and exact description of the same, reference being had to the annexed drawings, making part of this specification, in which—

Figure 1 is a plan as seen from above; Fig. 2, a side elevation; Fig. 3, a section through the line *a b*, and Fig. 4 is a perspective view of one of the blocks.

Letter *g* in Figs. 1 and 3 indicate the ribs that divide the cells, and letter *h* in the same figures indicate the hollow cells or compartments of the block.

The following description will enable any one skilled in the art to which our invention appertains to make and use the same.

Similar letters of reference represent corresponding parts of the drawings annexed.

The block composing the pavement may be made one foot square, more or less, as the case may require. These blocks are divided by the ribs *g* into compartments or cells *h* of a six-sided form. We make the cells of this form because it is most economical, giving greater strength to the block with a given amount of material than any other form in which the block can be made, and because it produces no long continuous straight lines upon which a horse can slip, and also because it is a good and convenient form for the outer edge or periphery of the block, which by its projections and recesses forms the joint between the blocks. The lower part of the periphery of the block is made square, while the upper part thereof is composed of the projections and recesses which are produced by the six-sided compartments or cells in which the block is divided by the ribs. The joint between the blocks is made by placing them together, so that the projecting part *c* in Figs. 1, 2, and 3 of the first block shall enter the recess *d* in the adjoining block and rest upon the square edge, forming the lower part of the periphery of the said block, and vice versa, whereby either block is prevented from moving up or down separately.

Now, we are aware that blocks of metallic pavement have been made in a variety of forms, and that the periphery of the blocks have been constructed in many different forms and shapes, but none of them have as yet been so constructed as to fulfill all the conditions necessary to make the pavement practical, or so as to overcome the objections which have thus far prevented the metallic pavement from coming into general use.

The conditions necessary to be complied with in constructing an iron pavement are, first, cheapness of the block, which can only be obtained by the use of little material; and, second, strength of the block, which in the use of little material can only be obtained by a proper disposition of that material; and, third, the joint between the blocks must be as strong as the body of the block, and the said joint must be so made as to yield to the frost without injury, and so that one of the blocks cannot settle without carrying the contiguous one with it; and, fourth, there must be no long, continuous straight lines or ribs in the upper surface of the block upon which a horse can slip. Now, we claim that our pavement complies with all of these conditions, and that a pavement cannot be made in any other form and comply with the conditions above referred to that dividing the block into hexagonal cells by means of ribs; in the manner shown by the drawings is the only way by which these conditions can be accomplished.

Take, for instance, the figure of a circle, which is that figure which encompasses the greatest area with the shortest circumscribing line, and which would therefore be the most economical figure for a pavement, if a series of them combined together would fill a given space without change of figure, so as to give the necessary strength, and so as not to leave an open or blank space between the figures. But this they will not do, so that in a combination of a series of these figures the points of contact between them will be nothing like so long as it is between hexagonal figures combined together. The circular figure, therefore, cannot make so strong a pavement with the same amount of metal as a six-sided figure, for if the spaces between the figures be filled up so as to make it as strong, it will make it much heavier, and consequently much more expensive. Take next the triangular figure and combine a series of them together, and it will be seen that they fill up the entire space without change of figure; but a triangular figure will not cover the same space with a given amount of metal as a hexagonal figure will and give the same strength, and, moreover, the upper surface of a block composed of a series of triangular figures will contain a series of long straight ribs, upon which an animal would be liable to slip.

The same objection that obtains against the use of a circular figure obtains against the use of an octagonal one—viz., a number of them combined together do not fill the entire space without change of figure, so that the points of contact between the figures will not be so long as in the case of the hexagonal figure, and the rib at the point of contact between the figures will be twice as thick as it will where the figures do not join, so that in the use of this figure a given amount of metal will not cover the same space and give the same strength that results from the use of the hexagonal figure.

In the use of a square figure very much the same objections occur as do in the use of a triangular one—viz., long straight ribs upon the upper surface, and less strength with a given amount of metal in covering a given space than would result from the use of a hexagonal figure.

We are of course aware that there is nothing new or patentable in the use of a hexagonal figure; we therefore lay no claim to it as such, but What we do claim, and desire to secure by Letters Patent, is—

1. Combining together a series of hexagonally-formed ribs and cells, so as to constitute a block of pavement of the form shown upon the drawings.

2. Constructing each cell perfect in itself, and by such construction making the cells of the upper periphery of the block not only uniform but answering as ledges to support the same upon the adjoining block, and thereby distribute the superincumbent weight equally along the whole side of the block, substantially in the firm manner herein described.

S. H. TITUS.
O. DES GRANGES.

Witnesses:
AMOS BROADNAX,
ROLLIN B. GRAY.